No. 621,885. Patented Mar. 28, 1899.
J. WISHART.
MECHANICAL TOY.
(Application filed June 3, 1898.)
(No Model.)
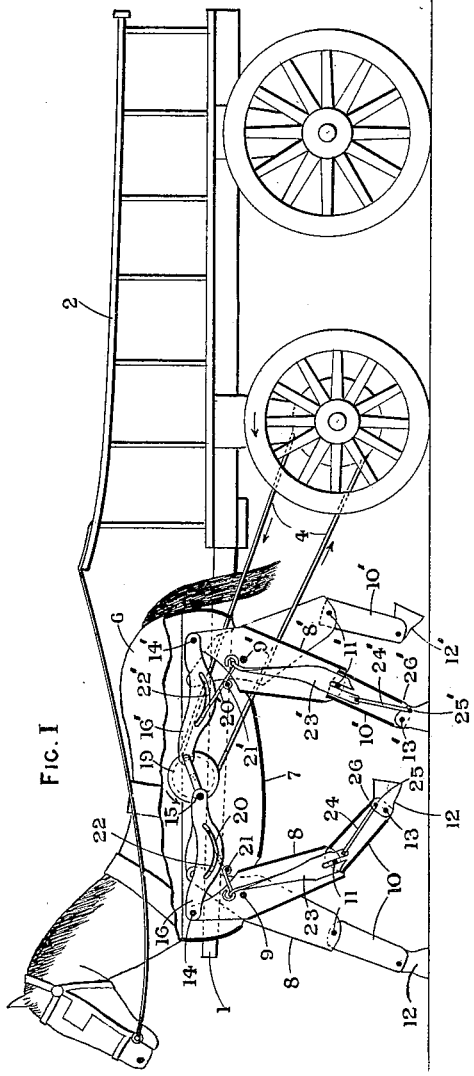

UNITED STATES PATENT OFFICE.

JAMES WISHART, OF BOOTLE, ENGLAND.

MECHANICAL TOY.

SPECIFICATION forming part of Letters Patent No. 621,885, dated March 28, 1899.

Application filed June 3, 1898. Serial No. 682,486. (No model.)

*To all whom it may concern:*

Be it known that I, JAMES WISHART, a subject of the Queen of Great Britain, residing in Bootle, near Liverpool, in the county of Lancaster, England, have invented certain new and useful Improvements in Toys, comprising a mechanical walking or trotting animal, of which the following is a specification.

My present invention has reference to an improved toy, comprising a mechanical walking or trotting animal; and the object is to considerably simplify and cheapen the construction hitherto adopted in this class of toys without detriment to either the appearance or action of the toy.

I have illustrated the application of my invention in the case of a four-wheeled wagon and a walking or trotting horse in the accompanying drawings, in which—

Figure I is an elevation in section through the two nearer legs, and Fig. II is a plan with the upper part of the horse removed.

Throughout the drawings the same parts are indicated by the same reference-figures. The several parts of the hind legs are distinguished from the analogous parts of the fore legs by an accent over the figures of reference.

As will be seen from an inspection of the drawings, the shafts 1 of the wagon 2 are rigidly attached at 3 to the body of the horse, so as to steady the latter, and the walking or trotting action of the horse is operated through the agency of the endless band 4 by the rotation of the fore wheel-axle 5 as the wagon is drawn along the floor.

The body of the horse is made in two portions, the upper portion 6 being preferably detachable, so as to give access to the mechanism. The lower portion 7, which carries the mechanism, is attached to the shafts 1, and the legs protrude through the four openings shown. Each leg is in three parts—an upper part pivoted to the body, a lower part pivoted to the upper part at the knee-joint, and the hoof pivoted at the bottom of the lower part.

It will be seen that to imitate the walking or trotting of the horse each leg as a whole must be given a to-and-fro movement, and that during this to-and-fro movement the lower part of the leg should move pivotally at the knee-joint and the hoof should move pivotally with reference to the lower part of the leg. The mechanism for effecting these motions is as follows, reference being made in the first instance to the near fore leg.

8 is the upper part of the leg pivoted to the body by the pin 9, which is common to both fore legs. 10 is the lower part of the leg pivoted on the knee-joint pin 11, and 12 is the hoof pivoted on the pin 13.

The to-and-fro movement of the leg as a whole is obtained by connecting the pin 14 in the prolongation of the leg to the revolving crank-pin 15 by means of the connecting-rod 16. The crank-shaft is journaled in the lower part 7 of the body and is operated, as already stated, from the fore axle 5, which rotates with the fore wheels by means of the band 4 and the pulleys 18 and 19. There are of course a crank-pin and connecting-rod for each leg, as shown clearly in the plan view, the cranks being so arranged that diagonally opposite legs move together, while adjacent legs move in opposition.

The means for giving the secondary motions to the lower part of the leg and the hoof are as follows: 20 is a rocking lever pivoted on the wire 21, which is fixed in the lower part of the body and is common to both fore legs. One end of this lever is bent laterally and engages with the curved slot 22 in the connecting-rod 16, and it is clear that the character and magnitude of the oscillatory motion produced in the lever 20 depend upon the motion of the connecting-rod and the contour of the slot. The shorter arm of the lever 20 gives a reciprocating motion to the stem 23, which extends downwardly within the upper part 8 of the leg and is guided below by its forked end which slides over the knee pivot-pin 11. The lower end of the stem 23 is linked by the light wire link 24 to the hoof at the point 25.

During the backward stroke of the leg the stem 23 is by the action of the lever 20 thrust down, so that its lower end enters the upper end of the lower leg 10, and as the stem fits therein the effect is to straighten the leg at the knee-joint and prevent bending at this point. At the same time the link 24 throws the hoof into the proper position for resting on the ground, as shown in the case of the more remote fore leg. The action of the stem in straightening and stiffening the knee-joint and in operating the hoof is shown in the sectional view of the hind leg, which is making its backward stroke with its hoof on the ground, the action of the fore and hind legs being similar.

During the forward stroke of the leg the stem 23 rises. The first effect is to tilt the hoof until it abuts against the part 26 of the lower leg, which prevents further pivotal motion of the hoof. In the meantime the stem 23 has been drawn up clear of the lower leg 10, and the effect of its further upward motion is to bend the leg at the knee-joint, as shown in the sectional view of the fore leg.

The action of the hind legs is similar to that described with reference to the fore legs, and the effect is to imitate very closely the actual motions of a walking or trotting horse as the toy is drawn along.

Instead of operating the mechanism of the horse by means of the rotation of the wheels of the wagon as the latter is drawn along it may be operated by a spring or other motor located either in the body of the horse or in the wagon, in which case the toy will be self-propelling.

It will of course be understood that a horse has been shown in the drawings merely by way of example and that the invention is applicable generally in the case of four-footed animals.

I have aimed particularly to provide a construction of few parts and capable of being cheaply made, and to this end I have endeavored as far as possible to duplicate the parts for one set of legs for use in the other set, thus materially reducing the cost of manufacture.

What I claim is—

1. In combination, the body, the jointed legs pivoted thereto, a crank-shaft with means for imparting movement thereto, connecting-rods 16 extending between the crank-shaft and the upper end of each leg, a sliding stem located within the upper leg-section and corresponding in width to the interior diameter of the lower leg-section, a link connection from the lower end of said stem to the hoof-section, and an operating connection between the upper end of said stem and the rod 16 arranged to cause said stem to be periodically inserted into the lower section with a wedging action to straighten said lower section, substantially as described.

2. In combination, the body, the jointed legs pivoted thereto, a crank-shaft with means for operating the same, a connecting-rod extending from the crank-shaft to the upper end of each leg, a stem in the upper section of each leg having a slotted lower end engaging the pin at the knee-joint, said lower end corresponding in width to the interior diameter of the lower section, means for reciprocating the stem to cause it to periodically enter the lower section with a wedging action to straighten said lower section, and a link connecting the lower end of the stem with the hoof-section, substantially as described.

3. In combination, the body, the jointed legs pivoted thereto, a crank-shaft, a rod 16 connecting each leg with a crank-shaft, a stem slidingly located in the upper leg-section and having its lower end corresponding in width to the interior diameter of the lower section and adapted to enter and be withdrawn therefrom, a link extending from the lower end of said stem to the hoof-section, a rocking lever located in proximity to the upper end of the upper leg-section having one end engaging the upper end of the stem and having its opposite end engaging a curved guideway in the rod 16, substantially as described.

In witness whereof I have hereunto set my hand in the presence of two witnesses.

JAMES WISHART.

Witnesses:
ROBERT A. SLOAN,
J. E. LLOYD BARNES.